F. A. WERNIG.
AUTOMOBILE BUMPER.
APPLICATION FILED JULY 16, 1921.

1,410,353. Patented Mar. 21, 1922.

Inventor
Frederick A. Wernig
By his Attorney
Joseph F. O'Brien

UNITED STATES PATENT OFFICE.

FREDERICK A. WERNIG, OF BROOKLYN, NEW YORK.

AUTOMOBILE BUMPER.

1,410,353.  Specification of Letters Patent.  Patented Mar. 21, 1922.

Application filed July 16, 1921. Serial No. 485,359.

*To all whom it may concern:*

Be it known that I, FREDERICK A. WERNIG, a citizen of the United States, and a resident of borough of Brooklyn, county of Kings, and State of New York, have invented certain new and useful Improvements in Automobile Bumpers, of which the following is a specification.

This invention relates to improvements in automobile bumpers.

The object of this invention is to produce an automobile bumper which may be manufactured at a low cost and which will perform its function of absorbing collision shocks effectively.

Another object of this invention is to enable any shock or strain which may be imposed upon any part of the bumper by a collision to be transmitted and equally distributed on all the parts of the bumper and to cause the yielding resistance to such shocks to be increased in accordance with the increase in the force or intensity of the shocks and at the same time procure greater resistance to intense shocks than is the case with other types of spring bumpers.

Another object of my invention is to produce a bumper in which the opposite ends of the impact bar are supported by spring arms which may be formed of relatively thin light metal and which branch in opposite directions from an attaching trunk portion, and furthermore each branch has integrally formed therewith springs substantially elliptical in conformation, the terminal portions of which abut against and resiliently back up and reinforce the curved branching portions of the supporting spring members.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Figure 1:
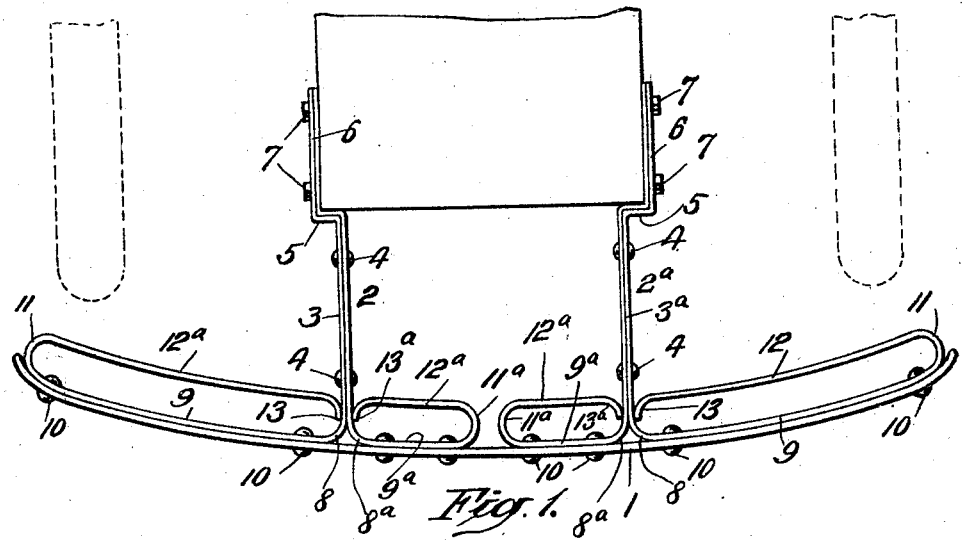
Fig. 1 is a plan view of an automobile bumper embodying my invention.
Figure 2:
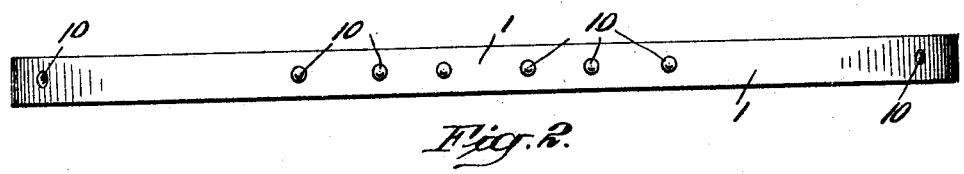
Fig. 2 is a front view of the bumper shown in Fig. 1.
Figure 3:
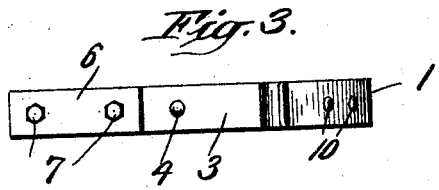
Fig. 3 is a side view of one end of the bumper.

Referring now to these drawings, 1 indicates an impact bar which, as shown, is forwardly bowed and extends to opposite sides of the automobile body and wheels. The bar 1 is, as illustrated, resiliently supported by arms 2—2ª each formed of a pair of strips of resilient metal which may be of relatively light gauge. The connecting portions 3, 3ª of each pair of strips abut against each other and are fastened together by rivets 4. Said abutting portions are preferably provided with an elbow portion 5 abutting against the car body and also have an integral attaching portion 6 which is fastened to the car body by bolts 7 in any suitable manner. Each of the connecting portions 3, 3ª extend outwardly and are curved or branched at 8—8ª in opposite directions into conformity and abutment or contact with the inner surface of the impact bar 1 to provide abutting portions 9, 9ª which are preferably rigidly connected to the impact bar by rivets 10. These abutting portions extend to return loops 11, 11ª which connect with return parallel portions 12, 12ª which terminate in terminal portions 13, 13ª which abut against the curved or branch portions 8, 8ª respectively. These terminal portions 13, 13ª have a return or reentrant bend which abut against the trunk portions 2, 2ª and serve to reinforce the impact member 1.

A bumper so constructed will, in the event of a collision, enable the taking up of light shocks without undue shock to the machine, and the elliptical springs will act to take up and absorb shocks on the impact bar that would otherwise cause permanent deformation thereof.

Having described my invention, I claim:—

1. A bumper embodying, in combination, a resilient impact bar curved forwardly and extending transversely across the automobile body and wheels, and resilient supporting members engaging the impact bar at opposite sides of the midplane of the car, each member composed of a pair of resilient strips connected together to form attaching portions, outwardly-extending trunk portions branching in opposite directions, oppositely-disposed curvilinear spring portions having an abutting portion connected with the impact bar intermediate the ends thereof and end portions adapted to contact with the trunk portions under strain to reinforce the contact bar.

2. A bumper embodying, in combination, a resilient impact bar curved forwardly and extending transversely across the automobile body and wheels, and resilient supporting members engaging the impact bar at opposite sides of the midplane of the car, each member composed of a pair of resilient strips connected together to form attaching portions, outwardly-extending trunk portions branching in opposite directions, oppositely-disposed curvilinear spring portions having an abutting portion connected with the impact bar intermediate the ends thereof and end portions abutting against the trunk portions and adapted to reinforce the impact bar under strain.

3. A bumper embodying, in combination, a resilient impact bar curved forwardly and extending transversely across the automobile body and wheels, and resilient supporting members engaging the impact bar at opposite sides of the midplane of the car, each member composed of a pair of resilient strips connected together to form attaching portions, outwardly-extending trunk portions branching in opposite directions, oppositely-disposed curvilinear spring portions having an abutting portion connected with the impact bar intermediate the ends thereof and freely movable end portions abutting against the trunk portions and adapted to reinforce the impact bar under strain.

4. A bumper embodying, in combination, a resilient impact bar curved forwardly and extending transversely across the automobile body and wheels, and resilient supporting members engaging the impact bar at opposite sides of the midplane of the car, each member composed of a pair of resilient strips connected together to form attaching portions, outwardly-extending trunk portions branching in opposite directions and integral elliptical portions, having a part abutting against and connected to the impact bar and oppositely disposed loop portions at the rear of said abutting portions extending into proximity to said trunk portions and adapted to reinforce the impact bar under strain.

5. A bumper embodying, in combination, a resilient impact bar curved forwardly and extending transversely across the automobile body and wheels, and resilient supporting members engaging the impact bar at opposite sides of the midplane of the car, each member composed of a pair of resilient strips connected together to form attaching portions, outwardly extending trunk portions branching in opposite directions, integral elliptical portions, having a part abutting against and connected to the impact bar and oppositely disposed loop portions at the rear of said abutting portions, said loops having freely movable terminal portions abutting against the curved trunk portion of the supporting member and adapted to reinforce the impact bar in differing degrees according to the strain of impact imposed thereon.

In witness whereof, I have signed my name to the foregoing specification in the presence of two subscribing witnesses.

FREDERICK A. WERNIG.

Witnesses:
  HELEN V. WHIDDEN,
  JULIUS H. LINTZ.